US008730968B2

(12) United States Patent
Baker et al.

(10) Patent No.: US 8,730,968 B2
(45) Date of Patent: May 20, 2014

(54) ARQ COMMUNICATION SYSTEM AND METHOD WITH ACKNOWLEDGMENT MAPPING

(75) Inventors: Matthew P. J. Baker, Canterbury (GB); Timothy J. Moulsley, Caterham (GB); Paul Bucknell, Brighton (GB)

(73) Assignee: Koninklijke Philips N.V., Eindhoven (NL)

( * ) Notice: Subject to any disclaimer, the term of this patent is extended or adjusted under 35 U.S.C. 154(b) by 1350 days.

(21) Appl. No.: 11/568,545

(22) PCT Filed: May 5, 2005

(86) PCT No.: PCT/IB2005/051475
§ 371 (c)(1),
(2), (4) Date: Nov. 1, 2006

(87) PCT Pub. No.: WO2005/109725
PCT Pub. Date: Nov. 17, 2005

(65) Prior Publication Data
US 2007/0223416 A1    Sep. 27, 2007

(30) Foreign Application Priority Data
May 6, 2004    (GB) .................................. 0410108.5

(51) Int. Cl.
*H04L 12/28*    (2006.01)
(52) U.S. Cl.
USPC .......................................... 370/394; 370/474
(58) Field of Classification Search
USPC ................. 370/394, 474, 464, 465, 389, 338; 714/746–751
See application file for complete search history.

(56) References Cited

U.S. PATENT DOCUMENTS

| 2003/0108027 A1 | 6/2003 | Kim et al. | |
| 2004/0038685 A1* | 2/2004 | Nakabayashi | 455/452.2 |
| 2005/0094561 A1* | 5/2005 | Raaf | 370/235 |

FOREIGN PATENT DOCUMENTS

EP    0889664 A2    1/1999

\* cited by examiner

*Primary Examiner* — Ajit Patel

(57) ABSTRACT

A method of operating a communication system in which transmissions in a first direction, say from a base station, comprise frames formed by data packets and transmissions in a second direction, say from a user equipment (U E), comprise substantially continuous transmissions having acknowledgement fields (ARQ-A, ARQ-B) for data packets and transmission gaps (GP) to allow the UE to make other measurements. The acknowledgement fields are mapped to the data packets to enable the base station to determine which data packets are being acknowledged. In order to avoid ambiguity in mapping acknowledgement fields to data packets when a transmission gap occurs, a single data packet is transmitted in either the frame whose acknowledgement field would occur in the transmission gap or the frame whose acknowledgement field would occur immediately following the transmission gap. Thus the base station will know that the acknowledgement field immediately following the transmission gap maps onto the data packet transmitted in the selected one of the two frames. In one embodiment a data packet is not transmitted in the frame whose acknowledgement field would occur immediately following the transmission gap. In a refinement of the method, the selection of the particular frame is related to the one which can support a high rate data packet.

18 Claims, 3 Drawing Sheets

ARQ COMMUNICATION SYSTEM AND METHOD WITH ACKNOWLEDGMENT MAPPING

The present invention relates to a communication system and to a method of operating the system. The present invention has particular, but not exclusive, application to packet data systems which utilize acknowledgements (ARQ), such as cellular communication systems such as UMTS (Universal Mobile Telecommunication System) and cdma2000.

In UMTS, a "compressed mode" may be used, in which the dedicated physical channel (DPCH) has specially-created transmission gaps to allow the user equipments (UEs) to make other measurements (for example to facilitate handover to systems operating on another frequency such as GSM). These transmission gaps may be in the uplink or downlink or both.

If an ARQ scheme is being used, as in High Speed Downlink Packet Access (HSDPA) or an Enhanced Uplink, the acknowledgements (ACKs) or negative acknowledgements (NACKs) are typically related to the corresponding data packets being acknowledged by a predetermined time offset. This means that a data packet may for example be transmitted in the uplink, but the acknowledgement would fall in a transmission gap in the downlink. Consequently ambiguities may arise regarding the association between ARQ acknowledgements and the packets to which they relate. The risk of ambiguities may be reduced by for example forbidding the transmission of any packet whose acknowledgement would fall in a transmission gap, or allowing the transmission of packets whose acknowledgement would fall in a transmission gap, but extending the time offset so the acknowledgement is delayed until after the transmission gap.

Figure 1:
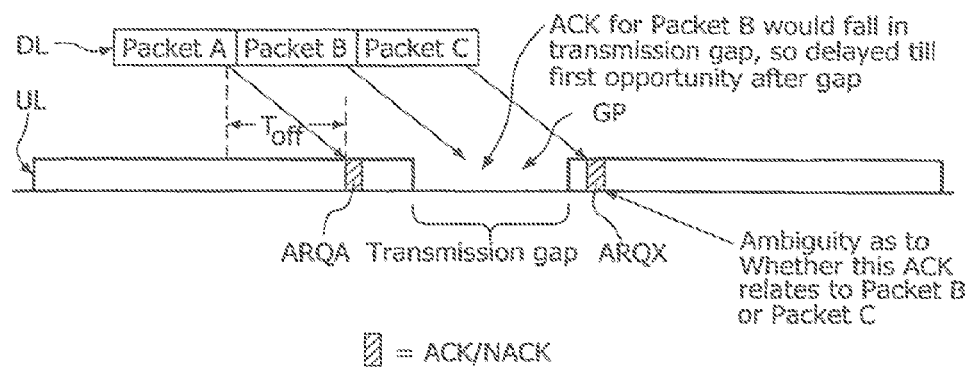

The first option mentioned above does not always make the best use of the communication resources, as it may result in transmission being forbidden when channel conditions are favourable. However, if the transmission gap is in one direction (for example downlink) only (with continuous transmission being permitted in the other direction (for example uplink)), the second option described above may result in an ambiguity as to which packet the acknowledgement relates to. This is illustrated in FIG. 1 of the accompanying drawings. In FIG. 1 three concatenated data packets A, B and C transmitted on say a downlink channel DL are shown together with say a continuous uplink channel UL having transmission gaps GP. The oblique arrows represent the association between the data packets and their respective acknowledgements ARQ, each acknowledgement ARQ having a predetermined time offset $T_{off}$ with respect to the data packet with which it is associated. The ARQs may be an ACK or a NACK. In the case of packet A the ARQA can readily be associated with packet A but in the case of ARQX which occurs after the gap GP there is some ambiguity as to whether it relates to packet B or packet C.

It is an object of the present invention to avoid ambiguity in associating acknowledgements with data packets.

According to one aspect of the invention there is provided a method of operating a communication system comprising a first station and a second station in which transmissions from the first station to the second station comprise frames formed by data packets and transmissions from the second station to the first station comprise transmissions having acknowledgement fields for data packets and transmission gaps, the acknowledgement fields being mapped to the data packets according to a first mapping rule except at least when the first mapping rule would position the acknowledgement field at least partly in a transmission gap, and the acknowledgement fields being mapped to the data packets according to a second mapping rule when the first mapping rule would position the acknowledgement field at least partly in a transmission gap, characterized in that the transmissions in the first direction comprise a single data packet in one of a first frame whose acknowledgement field would occur at least partly in a transmission gap according to the first mapping rule and a second frame whose acknowledgement field would be the first to occur following the transmission gap according to the first mapping rule, and in that the data packet is transmitted in the first frame if a criterion is satisfied in respect of the first frame.

According to a second aspect of the invention there is provided a method of operating a communication system in which transmissions in a first direction comprise frames formed by data packets and transmissions in a second direction comprise substantially continuous transmissions having acknowledgement fields for data packets and transmission gaps, the acknowledgement fields being mapped to the data packets, characterized in that the transmissions in the first direction comprise a single data packet in one of the frame whose acknowledgement field would occur in the transmission gap and the frame whose acknowledgement field would occur immediately following the transmission gap.

In an embodiment of the method in accordance with the present invention transmission is forbidden of data packets whose acknowledgement would fall immediately after a transmission gap, so that the acknowledgement field immediately following the gap may be used for a packet whose acknowledgement would have fallen in the gap.

In another embodiment of the method in accordance with the present invention the frame which supports a higher data rate is used for transmitting the data packet.

According to a third aspect of the invention there is provided a communication system comprising a first station and a second station, the first station having transceiving means for transmitting data packets in respective time frames, the second station having transceiving means for receiving the data packets and for transmitting a substantially continuous signal including acknowledgement fields for data packets and transmission gaps, the first station having means for mapping acknowledgement fields to data packets, characterized in that the first station has means for determining the occurrence of a transmission gap and in response to such a determination for sending a single data packet in one of the frame whose acknowledgement field would occur in the transmission gap and the frame whose acknowledgement field would occur immediately following the transmission gap.

Figure 3:
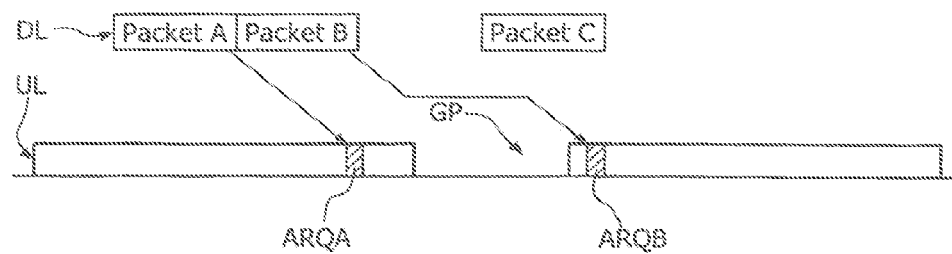
Figure 2:
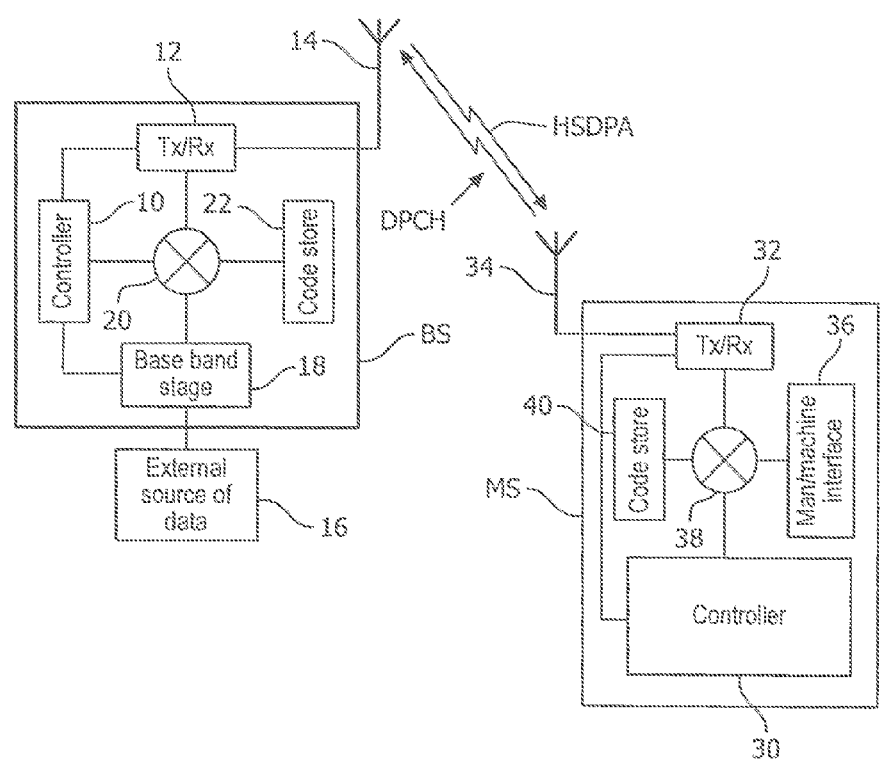
Figure 4:
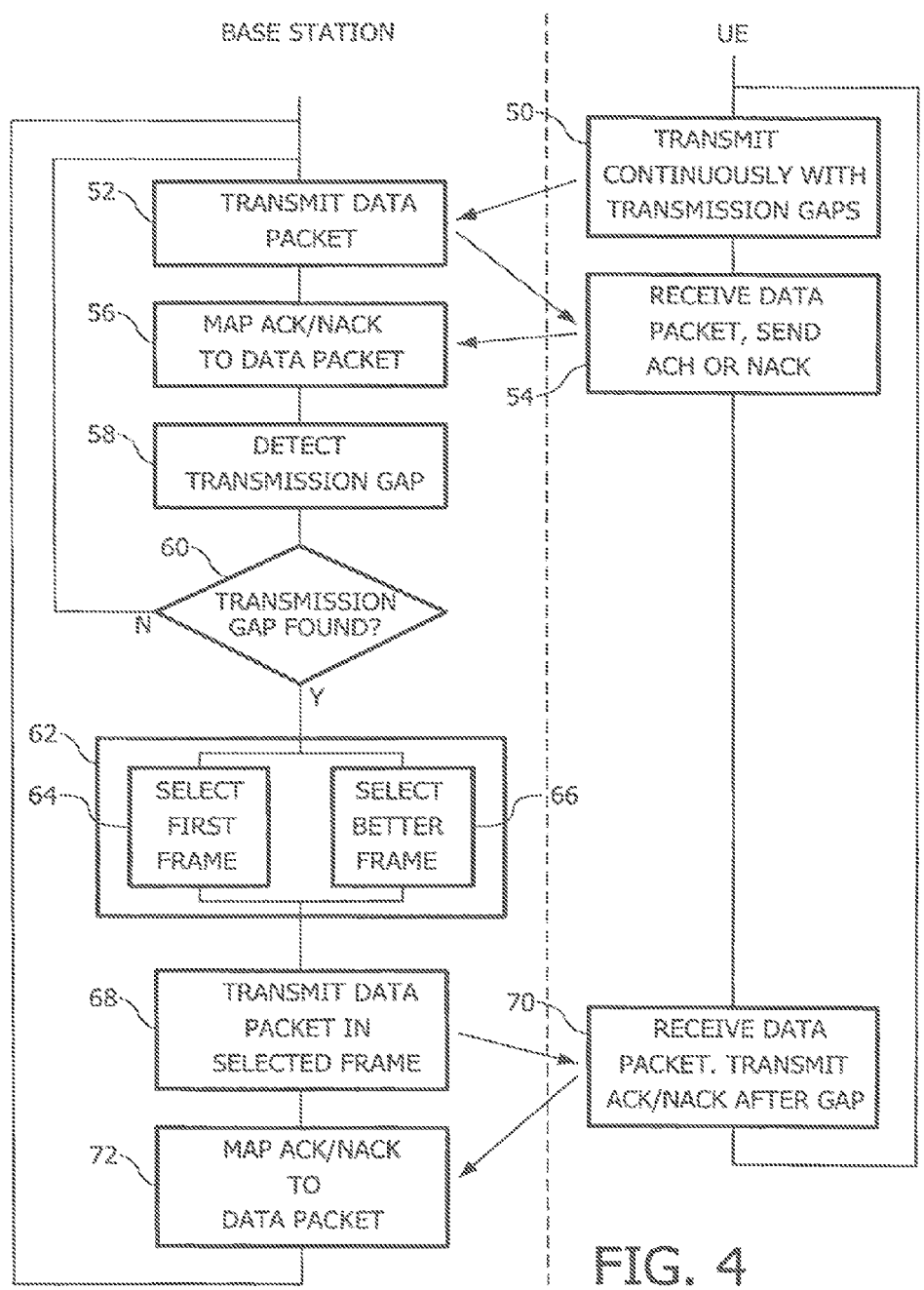

The present invention will now be described, by way of example, with reference to the accompanying drawings, wherein:

FIG. 1 is a diagram illustrating the problem of ambiguity in associating acknowledgements with data packets, FIG. 2 is a block schematic diagram of an embodiment of a communication system, FIG. 3 is a diagram illustrating one method of resolving the problem of associating acknowledgements with data packets, and FIG. 4 is a flow chart summarizing the method in accordance with the present invention.

In the drawings the same reference numerals have been used to indicate corresponding features.

Referring to FIG. 2, there is illustrated a radio communication system, for example an UMTS system, comprising a base station BS and a plurality of user equipments (UEs) or mobile stations MS, one of which is shown in FIG. 2. The mobile stations are able to roam within the radio coverage of the base station(s) and maintain radio communication by way of spread spectrum signaling on downlinks from the base station(s) and uplinks from the mobile stations. As is customary with spread spectrum signaling several signals can be transmitted simultaneously each signal having its own signature or spreading code selected from a set of signatures. Additionally power control has to be effected to prevent weaker signals being swamped by more powerful signals. Accordingly a base station can specify the maximum power at which a mobile station can transmit on the uplink.

Referring to FIG. 2, the base station BS is controlled by a controller 10 which carries out the many functions involved in the maintenance of the system and the sending and receiving of signals. A transceiver 12 is coupled to an antenna 14 for the transmission and reception of spread spectrum signals. An external source of data 16 is coupled to a base band stage 18 in which data is formatted into packets. The data packets are prepared for transmission by multiplying them in a multiplier 20 with a signature, for example a pseudo random code, obtained from a code store 22 under the control of the controller 10. The spread spectrum signal is passed to the transceiver for modulation and transmission.

In the case of a signal received at the antenna it is demodulated and despread by multiplying the demodulated signal with the appropriate signature. Thereafter the despread signal is passed to the base band stage 18.

The mobile station MS is controlled by a controller 30 which carries out the many functions involved in the operation of the mobile station, including the sending and receiving of signals. A transceiver 32 is coupled to an antenna 34 for the transmission and reception of spread spectrum signals from the base station BS. A man/machine interface 36, which includes a base band data formatting and deformatting stage, means for inputting data and means for outputting data, is coupled to a multiplier 38 to which is supplied a signature, for example a pseudo random code, obtained from a code store 40 under the control of the controller 30. A signal to be transmitted on the uplink is spread and is passed to the transceiver 32 for modulation and transmission.

In the case of a downlink signal received at the antenna 34 it is demodulated and despread by multiplying the demodulated signal with the appropriate signature. Thereafter the despread signal is passed to the man/machine interface 36.

In the case of UMTS the operating standard requires each mobile station to transmit spread spectrum uplink signals substantially continuously. These signals are formatted into successive frames or time slots whose duration is specified by the system. Two signals are often transmitted continuously and these are a dedicated physical data channel DPDCH and dedicated physical control channel DPCCH. Only DPCCH is transmitted when there is no data. Additionally a "compressed mode" may be used, in which the dedicated physical channel (DPCH) has specially-created transmission gaps to allow the user equipments (UEs) or mobile stations MS to make other measurements (for example to facilitate handover to systems operating on another frequency such as GSM). These transmission gaps may be in the uplink or downlink or both.

As shown in FIG. 1 transmission gaps GP may be provided in the uplink transmissions to enable mobile terminals to make measurements of other systems.

Referring to FIG. 1, from time to time the base station BS uses the downlink to transmit packet data to an identified mobile station using High-Speed Downlink Packet Access (HSDPA). Under the UMTS standard, the mobile station MS must transmit an acknowledgement either a positive (ACK) or negative (NACK) acknowledgement for each HSDPA packet received, depending for example on the outcome of a cyclic redundancy check (CRC) evaluation. The acknowledgement is sent at a predetermined time interval after each data packet so that the base station can associate the acknowledgement with its data packet. However if an acknowledgement is sent at a time coinciding with a gap in the uplink transmission then there is an ambiguity in associating the acknowledgements.

One embodiment of the method in accordance with the present invention avoids this problem by preventing the transmission of a data packet whose acknowledgement field will map into the uplink signal immediately after a transmission gap GP. This is illustrated in FIG. 3. In FIG. 3 the base station BS transmits concatenated data packets A and B. The controller 10, which is monitoring the uplink transmissions, determines that a transmission gap GP will occur at a point in time at which an acknowledgement would normally be sent in relation to data packet B. To avoid ambiguity in associating acknowledgements the controller forbids the transmission of a data packet C whose acknowledgement would normally fall first after the transmission gap GP. Simultaneously the controller 30 in the mobile station receiving the data packets delays the transmission the acknowledgement ARQB of the packet B by a time duration corresponding to the transmission gap GP.

However, this may not always be optimal, because the omitted frame may have supported a higher rate data packet. Therefore in a variant of the above embodiment of the method in accordance with the present invention, the acknowledgement field immediately following a transmission gap is used either for a packet transmitted in the directly-corresponding (according to the usual time offset) frame (referred to hereinafter as the second frame) or for a packet transmitted in the frame for which the acknowledgement would have fallen in the transmission gap (referred to hereinafter as the first frame), where the decision as to which frame the acknowledgement field relates to is made according to a predetermined criterion.

It is advantageous for the predetermined criterion to relate to the data rate which may be transmitted in the first frame. This data rate is typically identified in relation to one or more of buffer occupancy, channel quality and available transmit power. The data rate may be determined fully autonomously by the transmitting station, partially autonomously by the transmitting station within a range signaled by the receiving station, or dictated by the receiving station.

In particular, the acknowledgement field immediately following the transmission gap may be defined to relate to the first frame if the data rate which it is determined may be transmitted in the first frame is greater than a threshold, and to the second frame if the data rate which it is determined may be transmitted in the first frame is less than the threshold.

Advantageously, the threshold would be positioned at approximately the average value of data rate. This average value may be predetermined, signaled, or calculated over some preceding time period. Thus if the data rate which may be transmitted is below the average, it is probable that a higher data rate may be able to be transmitted in the second frame. On the other hand, if the data rate which may be transmitted in the first frame is above the average, it is probable that such a high data rate will not be possible in the second frame, so it is better to transmit the packet in the first frame.

As the data rate may be a function of buffer occupancy, channel quality, transmit power and/or cell loading, the threshold may likewise be a measure of any one of these quantities or a combination of the same.

Regardless of the decision, only one packet is transmitted and this packet is transmitted in either the first frame or the second frame. The receiving station does not necessarily need to be told explicitly which frame will contain the packet, although in some situations this may be possible. In either case, the transmitting station will know to which frame the acknowledgement relates, because only one of the frames contained a transmitted packet. In some embodiments, the transmitting station may instruct the receiving station explicitly whether to transmit the data packet in the first frame or the second frame.

The flow chart shown in FIG. 4 illustrates on the left hand side the operations carried out by the base station BS and on the right hand side the operations carried out by the UE or mobile station MS. The flow chart begins with block 50 which relates to the UE transmitting substantially continuously with transmission gaps. Block 52 relates to the base station transmitting a series of data packets. Block 54 relates to the UE receiving a data packet and sending an acknowledgement ARQ, namely either an ACK or NACK. Block 56 relates to the base station mapping the ARQ to the data packet. Block 58 relates to the base station detecting a transmission gap in the uplink signal. Block 60 relates to checking if a transmission gap has been detected. If the answer is no (N) the flow chart reverts to the block 52.

Alternatively if the answer is yes (Y) the flow chart proceeds to block 62 which relates to modifying the transmission of data packets to avoid an acknowledgement field occurring in the transmission gap. Two alternative choices are offered. In block 64 the first frame, that is the frame whose acknowledgement field would lie in the transmission gap, is selected in preference to the second frame whose acknowledgement field is immediately after the transmission gap. In block 66 the first and second frames are examined and the better frame, usually the one which can support higher rate data, is selected. Block 68 relates to the transmission of data in the selected frame. Block 70 relates to the UE receiving the data packet and transmitting an ARQ in the acknowledgement field immediately following the gap. Finally block 72 relates to the base station mapping the ARQ to the relevant data packet. The flow chart reverts to the beginning.

Although the present invention has been described to an embodiment in which data packets were transmitted on a downlink by a base station and signals with transmission gaps were transmitted on an uplink from a mobile station, the reverse is also possible with data packets being transmitted on the uplink and the signals with transmission gaps being on the downlink.

In the present specification and claims the word "a" or "an" preceding an element does not exclude the presence of a plurality of such elements. Further, the word "comprising" does not exclude the presence of other elements or steps than those listed.

From reading the present disclosure, other modifications will be apparent to persons skilled in the art. Such modifications may involve other features which are already known in the design, manufacture and use of communication systems and component parts therefor and which may be used instead of or in addition to features already described herein.

The invention claimed is:

1. A method of operating a communication system comprising a first station and a second station, the first station transmitting to the second station frames formed by data packets and the second station transmitting to the first station frames having acknowledgement fields for the data packets and transmission gaps, the method comprising acts of:
mapping an acknowledgement field which directly corresponds to a second frame according to a time offset to:
a data packet of the second frame when an acknowledgement field of a first frame according to the time offset does not fall at least partly in a transmission gap, and
a single data packet of one of the first and second frames when the acknowledgement field of the first frame according to the time offset falls at least partly in the transmission gap; and
determining, only when the acknowledgement field of the first frame according to the time offset falls at least partly in the transmission gap, that the single data packet is transmitted only in:
the first frame such that only the first frame which immediately precedes the second frame in time contains a packet which is the single data packet and the second frame does not contain a packet if a parameter related to the first frame is greater than a threshold value, and
the second frame if the parameter related to the first frame is less than the threshold value, and is determined fully autonomously by the second station, partially autonomously by the second station within a range signaled by the first station, or dictated by the first station.

2. The method as claimed in claim 1, wherein the parameter is at least one of the data rate supported in the first frame, the available transmit power in the first frame, a measure of the quality of the transmission channel, the amount of data which the first station has ready to transmit, and a measure of a traffic level handled by the second station.

3. The method as claimed in claim 1, wherein at least one of the parameter and the threshold is signaled to the first station.

4. The method as claimed in claim 1, wherein the threshold is equal to an average value of the parameter.

5. The method as claimed in claim 1, further comprising an act of the second station transmitting a signal to the first station, the signal notifying the first station whether to transmit the data packet in the first frame or the second frame.

6. The method as claimed in claim 1, further comprising an act of the first station transmitting a signal to the second station, the signal notifying the second station of which of the first frame and the second frame includes the data packet.

7. A communication system comprising:
a first station having a transceiver for transmitting data packets in respective frames; and
a second station having a transceiver for receiving the data packets and for transmitting a substantially continuous signal including acknowledgement fields for data packets and transmission gaps, and
a processor for:
mapping an acknowledgement field which corresponds with a second frame according to a time offset to:
a single data packet of a first frame when an acknowledgement field directly corresponding to the first frame according to the time offset falls at least partly in the transmission gap, and
a single data packet of the second frame when the acknowledgement field directly corresponding to the first frame according to the time offset does not fall at least partially in the transmission gap, and
for determining that the single data packet is transmitted in only the first frame such that only the first frame which immediately precedes the second frame in time contains a packet which is the single data packet and the second frame does not contain a packet if a parameter related to the first frame is greater than a threshold value and is determined fully autonomously by the second station, partially autonomously by the second station within a range signaled by the first station or dictated by the first station.

8. The system as claimed in claim 7, wherein
the first station transmits a data packet whose acknowledgement field falls in the transmission gap, and
the second station transmits the acknowledgement field relating to the transmitted data packet immediately after the transmission gap.

9. The system as claimed in claim 7, wherein the first station transmits a frame which supports a higher data rate for use in transmitting the data packet.

10. A first station for use in a communication system including a second station having a transceiver for receiving the data packets and for transmitting a substantially continuous signal including acknowledgement fields for data packets and transmission gaps, the first station comprising:
    a transceiver for transmitting data packets in respective first and second frames;
    a processor for mapping an acknowledgement field directly corresponding to the second frame according to a time offset to:
        a data packet of a selected one of the first and second frames when the acknowledgement field of the first frame according to the time offset falls at least partly in a transmission gap of the transmission gaps, and
        a single data packet of the second frame, when the acknowledgement field of the first frame according to the time offset does not fall at least partly in the transmission gap; and
    a sensor for determining that the selected one of the first and second frames is the first frame which immediately precedes the second frame and that a single data packet is transmitted in the first frame only of the first and second frames if a parameter related to the first frame is greater than a threshold value and is determined fully autonomously by the second station, partially autonomously by the second station within a range signaled by the first station or dictated by the first station.

11. A method of operating a communication system, the method comprising acts of:
    performing transmissions in a first direction from a first station to a second station including successive first and second frames of a plurality of frames;
    performing substantially continuous transmissions in a second direction from the second station to the first station including acknowledgement fields for data packets and transmission gaps;
    mapping an acknowledgement field which directly corresponds to the second frame according to a time offset to:
    a single data packet of the first frame and transmitting the data packet only in the first frame when the acknowledgement field which directly corresponds to the first frame according to the time offset falls in the transmission gap, and
    a data packet of a second frame, when the acknowledgement field which directly corresponds with the first frame according to the time offset does not fall in the transmission gap; and
    determining that the single data packet is transmitted only in the first frame of the first and second frames such that the second frame which immediately follows the first frame in time does not contain a packet if a parameter related to one of the frames is greater than a threshold value and is determined fully autonomously by the second station, partially autonomously by the second station within a range signaled by the first station or dictated by the first station, and wherein when the acknowledgement field directly corresponding to the second frame according to the time offset is mapped to the data packet of a first frame, only the single data packet is transmitted in only one of the first and second frames.

12. The method as claimed in claim 11, wherein a frame which supports a higher data rate is used as the first frame for transmitting the data packet.

13. The method as claimed in claim 1, further comprising an act of transmitting the single data packet only in the first frame.

14. The method as claimed in claim 13, wherein the method maps the acknowledgement field which directly corresponds to the second frame according to the time offset to the data packet of the first frame.

15. The method as claimed in claim 14, wherein the acknowledgment field which directly corresponds to the second frame according to the time offset is a first acknowledgment field after the transmission gap.

16. A method of operating a communication system having first and second stations, the method controlled by at least one controller and comprising acts of:
    determining whether an acknowledgment field which directly corresponds to a first frame according to a time offset falls within a transmission gap, the first frame immediately preceding a second frame in time, the first and second frames each being configured to contain a corresponding data packet;
    mapping an acknowledgement field which directly corresponds to the second frame according to the time offset to the second frame when it is determined that the acknowledgment field which directly corresponds to the first frame according to the time offset does not fall within the transmission gap; and
    selecting a single frame which will support higher rate data from the first and second frames which are consecutive in time, when it is determined that the acknowledgment field which directly corresponds to the first frame according to the time offset falls within the transmission gap.

17. The method of claim 16, further comprising an act of transmitting only a single packet in only the selected single frame of the first and second frames with the other frame of the first and second frames being empty, when it is determined that the acknowledgment field which directly corresponds to the first frame according to the time offset falls within the transmission gap.

18. The method of claim 17, further comprising an act of transmitting first and second packets in each of the first and second frames, respectively, when it is determined that the acknowledgment field which directly corresponds to the first frame according to the time offset does not fall within the transmission gap.

* * * * *